(12) United States Patent
Tubi et al.

(10) Patent No.: US 9,961,574 B1
(45) Date of Patent: May 1, 2018

(54) TECHNIQUES TO IDENTIFY APPLICATIONS BASED ON NETWORK TRAFFIC

(71) Applicant: Facebook, Inc., Menlo Park, CA (US)

(72) Inventors: Lior Tubi, Tel Aviv (IL); Nimrod Priell, Tel Aviv (IL); Israel Nir, Tel Aviv (IL); Dekel Shmuel Naar, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 142 days.

(21) Appl. No.: 14/641,860

(22) Filed: Mar. 9, 2015

Related U.S. Application Data

(60) Provisional application No. 62/127,271, filed on Mar. 2, 2015, provisional application No. 62/127,251, filed on Mar. 2, 2015.

(51) Int. Cl.
    *H04W 24/08* (2009.01)
    *H04M 1/725* (2006.01)
    *H04L 12/26* (2006.01)

(52) U.S. Cl.
    CPC ............. *H04W 24/08* (2013.01); *H04L 43/18* (2013.01); *H04M 1/72522* (2013.01)

(58) Field of Classification Search
    CPC .... H04W 24/08; H04M 1/72522; H04L 43/18
    See application file for complete search history.

(56) References Cited

U.S. PATENT DOCUMENTS

| | | | | |
|---|---|---|---|---|
| 7,613,692 | B2 * | 11/2009 | Hamilton | G06F 17/30867 |
| 7,664,048 | B1 * | 2/2010 | Yung | H04L 41/28 |
| | | | | 370/235 |
| 8,443,438 | B1 * | 5/2013 | Sharir | H04L 67/02 |
| | | | | 380/258 |
| 8,468,164 | B1 * | 6/2013 | Paleja | G06F 17/30867 |
| | | | | 707/767 |
| 8,473,749 | B1 * | 6/2013 | Madsen | H04L 67/34 |
| | | | | 713/187 |
| 9,319,913 | B2 * | 4/2016 | Raleigh | H04L 41/0893 |
| 2011/0314145 | A1 * | 12/2011 | Raleigh | H04L 41/0893 |
| | | | | 709/224 |
| 2012/0042367 | A1 * | 2/2012 | Papakostas | H04L 63/0281 |
| | | | | 726/7 |

(Continued)

*Primary Examiner* — Tejis Daya

(57) ABSTRACT

Techniques to identify applications based on network traffic are described. In one embodiment, an apparatus may comprise a client record component, a traffic monitoring component, a profiling component, and a traffic analysis component. The client record component may be operative to store a client application map, the client application map to represent installations of a plurality of applications on a plurality of client devices. The traffic monitoring component may be operative to monitor training network traffic and additional network traffic on one or more network interfaces, the training network traffic generated by the plurality of client devices. The profiling component may be operative to generate a network profile map using machine learning based on the training network traffic and the client application map. The traffic analysis component may be operative to identify one or more application of the plurality of applications. Other embodiments are described and claimed.

25 Claims, 12 Drawing Sheets

(56) References Cited

U.S. PATENT DOCUMENTS

| | | | |
|---|---|---|---|
| 2014/0036697 A1* | 2/2014 | Annan | H04L 67/28 370/252 |
| 2014/0113588 A1* | 4/2014 | Chekina | G06F 21/552 455/410 |
| 2014/0273923 A1* | 9/2014 | Papakostas | H04W 24/08 455/405 |
| 2015/0234901 A1* | 8/2015 | Moritz | G06F 17/30539 707/776 |
| 2015/0356581 A1* | 12/2015 | Litmanovich | H04W 4/00 705/7.33 |

\* cited by examiner

700

*Receive a client application map, the client application map to represent installations of a plurality of applications on a plurality of client devices.*
702

*Receive training network traffic from one or more network interface controllers, the training network traffic exchanged with at least some of the plurality of client devices.*
704

*Generate a network profile map using machine learning based on the training network traffic and the client application map, the network profile map comprising application-specific traffic patterns defining relationships between the plurality of applications and network traffic produced by the plurality of applications.*
706

*Receive additional network traffic.*
708

*Identify one or more applications of the plurality of applications as having contributed to the additional network traffic based on the network profile map.*
710

*FIG. 7*

TECHNIQUES TO IDENTIFY APPLICATIONS BASED ON NETWORK TRAFFIC

RELATED APPLICATIONS

This application claims the benefit of and priority to U.S. Provisional Patent Application No. 62/127,271, titled "Techniques to Identify Application Foreground/Background State Based on Network Traffic," filed Mar. 2, 2015, the entirety of which is incorporated herein by reference. This application claims the benefit of and priority to U.S. Provisional Patent Application No. 62/127,251, titled "Techniques to Identify Applications Based on Network Traffic," filed Mar. 2, 2015, the entirety of which is incorporated herein by reference.

BACKGROUND

Mobile devices may run applications, commonly known as "apps," on behalf of their users. These apps may be distributed through one or more app repositories provided by the first-party manufacturer of the device or operating system or through a third party. These apps may engage in network activity on the mobile device, such as through a cellular or Wi-Fi network. Users may install apps, use apps while they are installed, have them installed without using them, and uninstall them.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to identify applications based on network traffic. Some embodiments are particularly directed to techniques to identify applications based on network traffic using machine learning for the analysis of application usage. In one embodiment, for example, an apparatus may comprise a client record component, a traffic monitoring component, a profiling component, and a traffic analysis component. The client record component may be operative to store a client application map, the client application map to represent installations of a plurality of applications on a plurality of client devices. The traffic monitoring component may be operative to monitor training network traffic and additional network traffic on one or more network interfaces, the training network traffic generated by the plurality of client devices. The profiling component may be operative to generate a network profile map using machine learning based on the training network traffic and the client application map, the network profile map comprising application-specific traffic patterns defining relationships between the plurality of applications and network traffic produced by the plurality of applications. The traffic analysis component may be operative to identify one or more applications of the plurality of applications as having contributed to the additional network traffic based on the network profile map. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the application identification system of FIG. 1.

DETAILED DESCRIPTION

Figure 1:
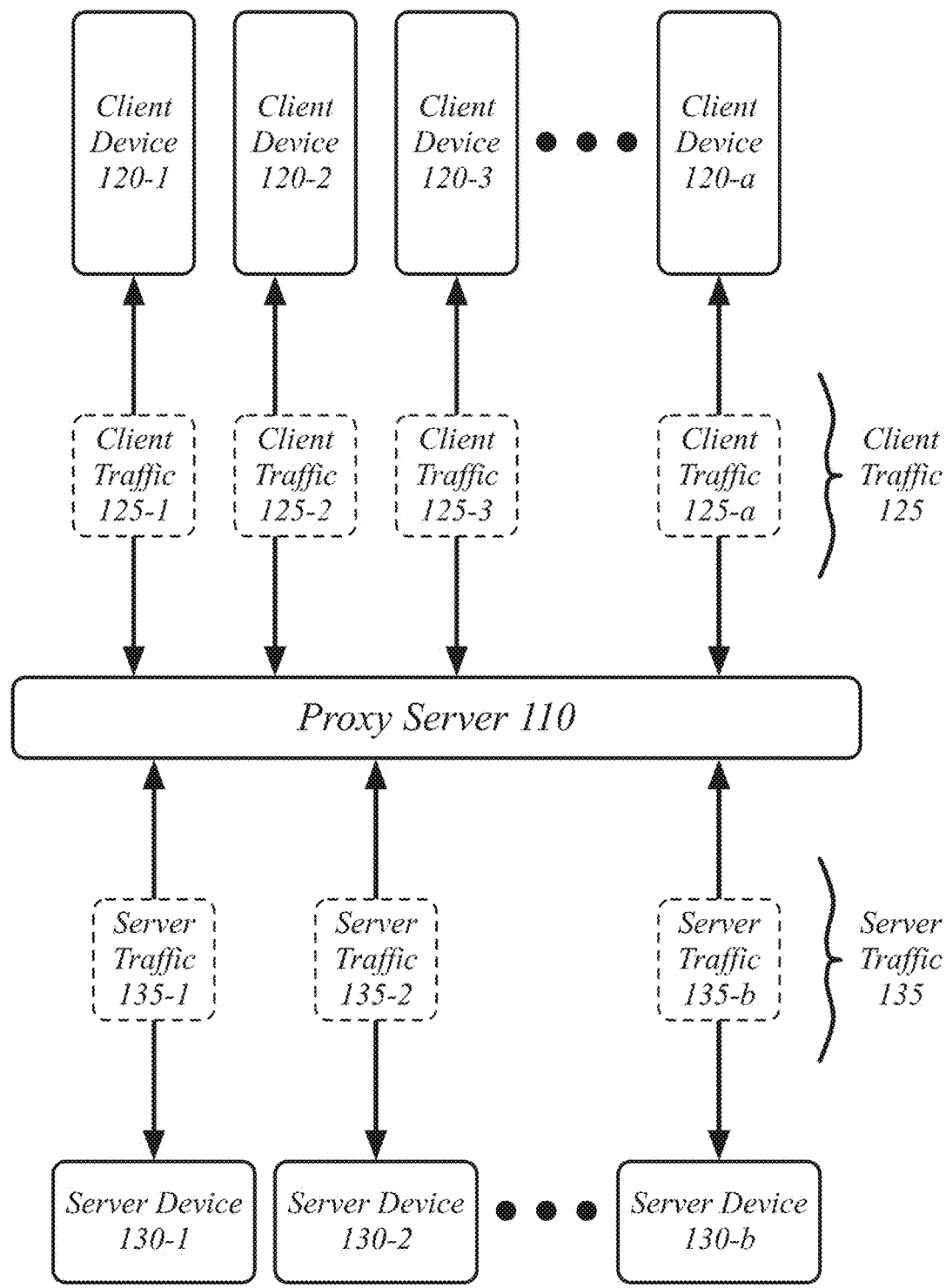
FIG. 1 illustrates an embodiment of an application identification system.

Various embodiments are directed to techniques for determining app usage and app installation by monitoring the network traffic being transmitted into and out of a device. Users of mobile devices may have the ability to install apps on their mobile device. The marketplace for these apps may be an important economic and functional element of the use these devices. However, market statistics for apps—how many installations of an app are live in the user-base, how often is an app used, etc.—may be difficult to determine.

Many apps produce network traffic as part of their operation. For some apps, the network is of primary importance: web browsers, streaming audio or video players, news readers, online games, etc. For other apps, the network may still be used while not being central to the functioning of the app: periodic updating of an offline database, competitive ranking in offline games, etc. In either case, apps may create network traffic, which may contain patterns that may be used to profile the apps. By identifying apps based on their network traffic app usage statistics may be generated without access to the internal operations of the mobile devices, expanding the size of the devices available for sampling and increasing the accuracy of the statistics generated. As a result, the embodiments can improve the affordability, scalability, and practicality of generating app usage statistics.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter. Although the embodiments shown in the drawings may have a limited number of elements in a certain topology, it will be appreciated that the embodiments may include more or less elements in alternate topologies if desired for a given implementation.

It is worthy to note that "a" and "b" and "c" and similar designators as used herein are intended to be variables representing any positive integer. Thus, for example, if an implementation sets a value for a=5, then a complete set of components 122 comprising the individual components 122-1 through 122-a may include components 122-1, 122-2, 122-3, 122-4 and 122-5. The embodiments are not limited in this context.

FIG. 1 illustrates a block diagram for a network environment for an application identification system 100. As shown in FIG. 1, a proxy server 110 acts as an intermediary in the communication between client devices 120 and server devices 130, receiving and transmitting client traffic 125 and server traffic 135. In one embodiment, the application identification system 100 may comprise a computer-implemented system having multiple components, which may comprise software and/or hardware elements.

A proxy server 110 may be interposed in a network between client devices 120 and server devices 130. Client devices 120 may exchange network traffic with the server devices 130, both sending data to and receiving data from server devices 130. The proxy server 110 may act as an intermediary between the client devices 120 and the server devices 130 for these exchanges. The proxy server 110 may exchange client traffic 125 with the client devices 120 and exchange server traffic 135 with the server devices 130 while acting as an intermediary.

The proxy server may receive client traffic 125-1 from a client device 120-1 and transmit the client traffic 125-1 to server device 130-1 as server traffic 135-1. In some embodiments, server traffic 135-1 may be identical in content to client traffic 125-1, such as a duplication of client traffic 125-1 as received by the proxy server 110 retransmitted to the server device 130-1. In other embodiments, client traffic 125-1 may be modified in the production of server traffic 135-1, such that the server traffic 135-1 transmitted to the server device 130-1 is a modification of the client traffic 125-1 received at the proxy server 110. The client traffic 125-1 may be modified for the production of server traffic 135-1 so as to aid the client device 120-1 and/or server device 130-1 in their communication with each other and in the performance of their respective tasks.

The proxy server may receive server traffic 135-1 from a server device 130-1 and transmit the server traffic 135-1 to client device 120-1 as client traffic 125-1. In some embodiments, client traffic 125-1 may be identical in content to server traffic 135-1, such as a duplication of server traffic 135-1 as received by the proxy server 110 retransmitted to the client device 120-1. In other embodiments, server traffic 135-1 may be modified in the production of client traffic 125-1, such that the client traffic 125-1 transmitted to the client device 120-1 is a modification of the server traffic 135-1 received at the proxy server 110. The server traffic 135-1 may be modified for the production of client traffic 125-1 so as to aid the client device 120-1 and/or server device 130-1 in their communication with each other and in the performance of their respective tasks.

It will be appreciated that a proxy server acting as the intermediary between the client devices 120 and server devices 130 is merely one embodiment of the enclosed techniques. As proxy servers may already be interposed between network actors they may form a particularly convenient device for performing network traffic monitoring. However, any type of intermediary device, including any type of intermediary server, may be used to perform the monitoring and analysis of network traffic between client devices 120 and server devices 130.

The proxy server 110 may monitor the client traffic 125 and server traffic 135 received from the client devices 120 and server devices 130. The proxy server 110 may extract elements of the client traffic 125 and server traffic 135 and log them for analysis. The proxy server 110 may perform analysis on the client traffic 125 and server traffic 135 and on the logged elements of the client traffic 125 and server traffic 135. Alternatively, analysis may be performed by a separate device from the proxy server 110 with the proxy server 110 performing monitoring and logging of extracted elements of the network traffic, transferring the logged information to the separate device for analysis.

Monitoring network traffic, such as client traffic 125 and server traffic 125, may comprise receiving network traffic exchanged via a network interface controller (NIC). A NIC comprises a hardware component connecting a computer device to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network traffic transferred to memory storage may be analyzed, with various elements extracted for use in machine learning and app recognition.

Application identification system 100 may include an authorization server (or other suitable component(s)) that allows users to opt in to or opt out of having their actions logged by application identification system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of proxy server 110 through blocking, data hashing, anonymization, or other suitable techniques as appropriate.

Figure 2:
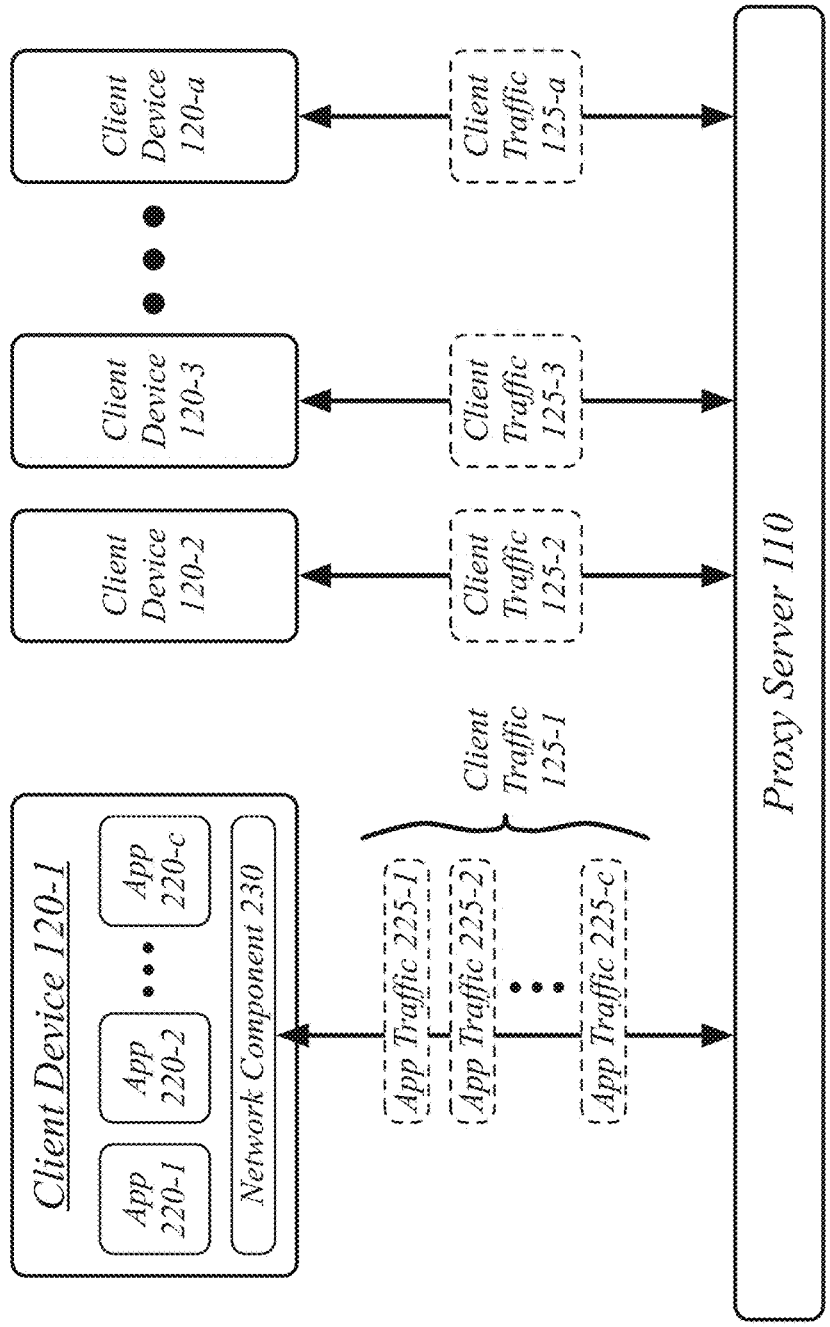
FIG. 2 illustrates an embodiment of a client device running multiple apps that engage in network activity.

FIG. 2 illustrates a block diagram of a particular client device 120-1 running multiple apps 220 that engage in network activity with the proxy server 110. As shown in FIG. 2, the client traffic 125 for the client devices 120 may be generated by one or more apps running on the client devices 120.

The client devices 120 may support and run one or more apps. For instance, client device 120-1 may store and run apps 220, with apps 220 producing and receiving network traffic. Apps 220 may produce and receive network traffic while both foregrounded and backgrounded. Each app may exchange network traffic specific to it, such as app 220-1 exchanging app traffic 225-1, app 220-2 exchanging app traffic 225-2 and so on. App traffic 225 may collectively comprise the client traffic 125-1. Client traffic 125 may be generally comprised of the traffic for various apps running on the client devices 120. Client traffic 125 may also comprise additional traffic not associated with any app, such as network traffic associated with an operating system of the client devices 120.

The client devices 120, including client device 120-1, may comprise a network component 230. The network component 230 may be operative to perform network activity on behalf of client device 120-1 including the apps 220, an operating system of client device 120-1, and utilities included with client device 120-1. For instance, client device 120-1 may include a utility for the downloading of apps from an app repository.

An app repository may host a variety of mobile apps for use by various client devices. An app repository may be associated with a provider of a client device, a provider of an operating system of a client device, or be a third-party app repository. Various client devices may be manufactured by different providers. Client devices manufactured by different providers may, in various embodiments, use the same or different app repositories. The same app may be provided by different app repositories, including where an app is provided with differing implementations for different client devices provided by different manufacturers.

The proxy server 110 may request, scrape, or otherwise retrieve application metadata from the app repository. This metadata may be used to identify the download and installation parameters for the applications. This metadata may therefore be used to identify the download of an app from the app repository. The proxy server 110 may monitor network traffic and identify application metadata retrieved from the app repository, and thereby identify that an application is being requested for download or is being downloaded from the app repository by a client device. As such, the application metadata may be used to determine that an application is being downloaded for installation by a client device and that the application will therefore be present on the client device.

The proxy server 110 may receive app traffic 225 from client device 120-1 and use app traffic 225 to identify the apps 220 installed on client device 120-1. As app traffic 225 may collectively comprise client traffic 125-1, some or all of the apps 220 on a client device 120-1 may be identified according to the client traffic 125-1 received by the proxy server 110 from the client device 120-1. The client traffic 125 may generally be used by the proxy server 110 to identify some or all of the apps installed on the client devices 120.

In some cases, various apps on different client devices may exchange traffic with each other via the proxy server 110 rather than exchanging traffic with a server device. It will be appreciated that any of the monitoring, logging, and analysis as described with reference to client devices 120 interacting with server devices 130 may also be applied to the client devices 120 interacting with each other, such as may correspond to peer-to-peer or other forms of client-to-client communication.

Figure 3:
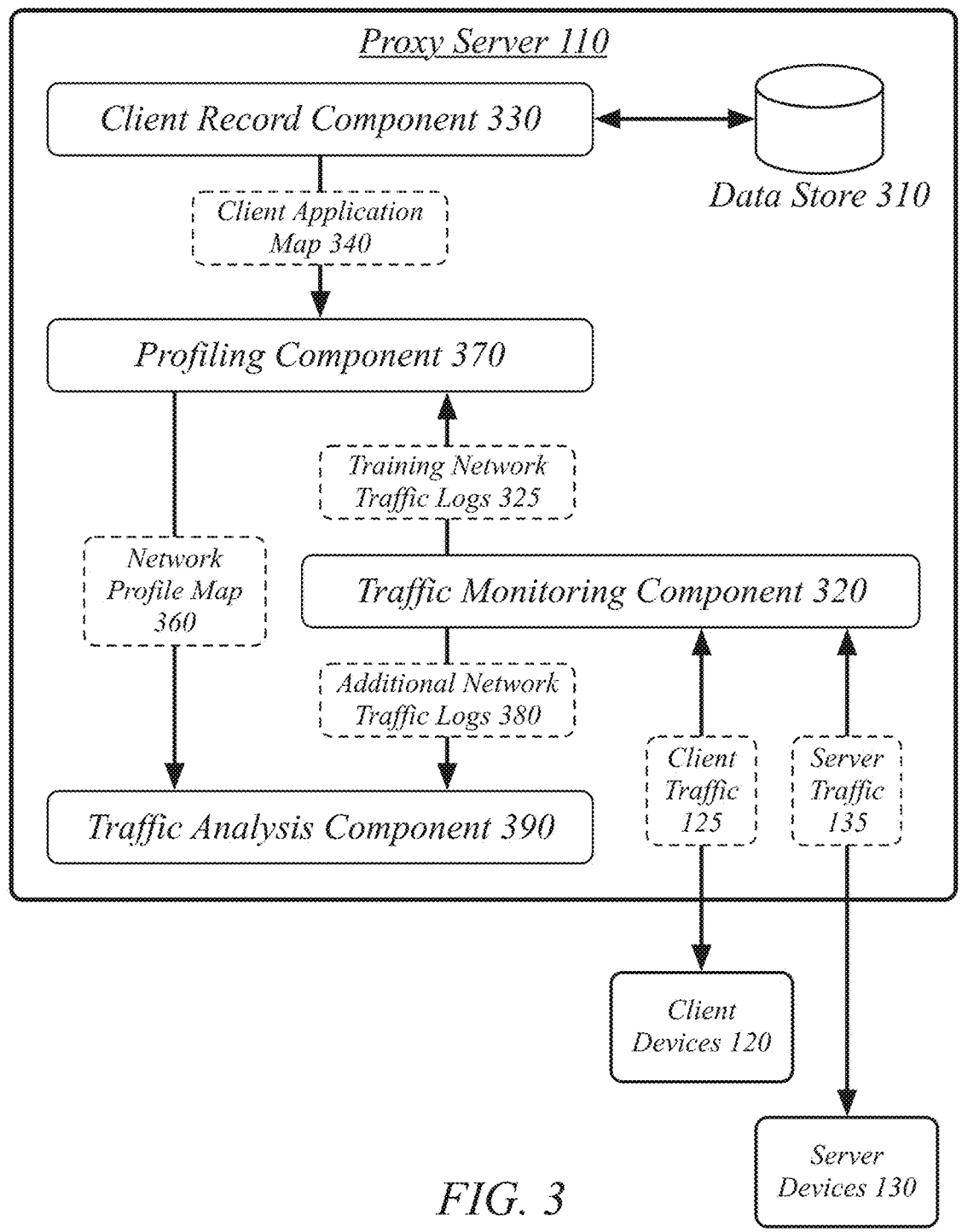
FIG. 3 illustrates the generation of a network profile map by a proxy server.

FIG. 3 illustrates the generation of a network profile map 360 by a proxy server 110. As shown in FIG. 3, the proxy server 110 may be communicatively connected to client devices 120 and server devices 130. The proxy server 110 may comprise a plurality of components, including a traffic monitoring component 320, a client record component 330, a profiling component 370, and a traffic analysis component 390.

The client record component 330 may be generally arranged to store a client application map 340, the client application map 340 to represent installations of a plurality of apps on a plurality of client devices 120. The client application map 340 may comprise installation of the plurality of application on the plurality of client devices 120 inferred from implicit and explicit information gathered about the plurality of client devices 120 and any apps installed thereon. In order to learn the patterns in client network traffic that reflect the activity of a particular app on a client device, the network traffic of client devices with known installations is analyzed in contrast with the network traffic of client devices without known installations to find those elements that only or are more likely to appear in the traffic from the client devices known to have the particular app installed. The client application map 340 reflects this initial information that is used to learn the patterns. The client application map 340 may be stored in a data store 310 on the proxy server 110 or otherwise available to the proxy server 110, such as on a network-accessible storage server. The client application map 340 may be passed to the profiling component 370 by the client record component 330 after retrieval from the data store 310.

The client application map 340 may be built using a variety techniques. In some cases, the proxy server 110 may monitor previous network traffic of the plurality of client devices 120 and detect app downloads in the monitored previous network traffic. One or more of the client devices 120 may send requests to one or more app repositories for various apps. The app repositories may comprise some of the server devices 130 with which the proxy server 110 exchanges server traffic 135. One or more app repositories may transmit apps to the one or more requesting client devices in response. The proxy server 110 may detect both the requests for the apps and the app downloads. Based on either or both the proxy server 110 may determine at least a portion of the client application map 340, indicating in the client application map 340 that the clients detected to have requested and/or received particular apps may have those particular apps installed and may engage in network traffic from and to those particular apps.

In some cases, the proxy server 110 may receive from one or more of the client devices 120 a complete or partial list of apps installed on those client devices. A local application on a client device may examine the memory, drive, or other temporary or persistent storage of the client device to determine apps installed on or running in that storage. A local application on a client device may examine or interrogate other running application to determine their identity. A local application on a client device may interrogate an operating system of the client device as to which apps are installed, running, or producing network traffic on the client device. The local application may then report the apps it discovered through examination or interrogation to the proxy server 110 for inclusion in the client application map 340. In other embodiments, the operating system of the client device itself may perform interrogation or examination of storage or running apps and report its results to the proxy server 110. The operating system may maintain a list of installed apps updated during the installation and removal of apps from the client device which it reports to the proxy server 110 or which it uses to respond to interrogation from a local application.

The traffic monitoring component 320 may be generally arranged to monitor training network traffic and additional network traffic, the training network traffic generated by at least some of the plurality of client devices 120. The traffic monitoring component 320 may produce training network traffic logs 325 from the training network traffic and pass the training network traffic logs 325 to the profiling component 370. The traffic monitoring component 320 may produce additional network traffic logs 380 from the additional network traffic and pass the additional network traffic logs 380 to the traffic analysis component 390. The logs may be passed at regular intervals, incrementally as they are generated, upon request, or according to any other schedule or initiation.

The training network traffic logs 325 and the additional network traffic logs 380 may be generated from the client traffic 125 exchanged with the client devices 120 and/or the server traffic 135 exchanged with the server devices 130. The client traffic 125 exchanged with the proxy server 110 may result in server traffic 135 exchanged with the server devices 130 or in additional client traffic 125 exchanged with other client devices of the plurality of client devices 120. The network traffic logs may include elements extracted from the network traffic. The extracted elements may include source and destination network addresses of the traffic. The extracted elements may include uniform resource locators (URLs) and hypertext transport protocol (HTTP) parameters contained within the network traffic. The extracted element may include a type of protocol used in the network traffic; in some embodiments, the type of protocol may not appear as a literal element of a data transmission but instead be inferred by various properties of the transmission. The extracted elements may generally include any element of the network traffic appropriate to extraction and analysis for the purpose of app identification.

Apps may use URLs to identify the location of network resources with which they interact. These URLs may contain domain names used to generate internet protocol (IP) addresses used for the routing of network traffic to the resources. These URLs may contain resource locations within the routed destination of the network traffic, such as one or more names indicating a directory path and resource name at a destination server such as a web server. These URLs, including any or all of domain names, directory paths, and resources names may be logged and analyzed for the identification of app-specific traffic patterns and the identification of apps installed on a client device.

Network traffic sent by apps on client devices 120 may be encoded according to the HTTP standard and may contain HTTP parameters. These HTTP parameters may include a user-agent specified by the app generating an HTTP request or other HTTP communication. The user-agent may be specified in a header of a HTTP message sent by a client device. Other protocols may also use or support user-agent fields. For example, the session initiation protocol (SIP) supports the use of a user-agent field. In general, a user-agent field may be extracted from any message containing a user-agent field, logged, and used in analysis. In general, any HTTP parameter may be extracted, logged, and used in analysis. In general, any parameter or a protocol may be extracted, logged, and used in analysis.

The profiling component 370 may be generally arranged to generate a network profile map 360 using machine learning based on the training network traffic and the client application map 340, the network profile map 360 comprising app-specific traffic patterns defining relationships between the plurality of apps and network traffic produced by the plurality of apps. The training network traffic logs 325, generated from the training network traffic, may be divided into information extracted from network traffic for client devices inferred to have installations of various apps and information extracted from network traffic for client devices that have not been inferred to have installations of those various apps. The information extracted from network traffic for client devices inferred to have installations of a particular app may be used as a positive data set and information extracted from network traffic for client devices that have not been inferred to have installations of those various apps may be used as a negative data set. The profiling component 370 may generate a portion of the network profile map 360 corresponding to a network traffic pattern specific to a particular app by identifying the network traffic pattern as being more prominent in the positive data set as compared to the negative data set using machine learning techniques.

The traffic analysis component 390 may be generally arranged to identify one or more apps of the plurality of apps as having contributed to the additional network traffic based on the network profile map 360. Upon receiving the additional network traffic logs 380—or as the additional network traffic logs 380 are received, such as in the case where logged information is analyzed as it is received—the logged information may be compared to the traffic patterns stored in the network profile map 360 to determine whether any of the logged traffic matches the previously-identified patterns. Where logged traffic matches a traffic pattern, the client devices having produced the logged traffic are identified as having the apps associated with the traffic pattern installed on them. Further, as those apps have produced network traffic, the apps are identifies as having being active on the respective client devices.

The identification of apps being present on client devices and apps producing network traffic on client devices may be used to generate statistics related to the presence and use of apps. For instance, statistics may be generated about the installation prevalence, market penetration, and other implications of the presence of apps on client devices. Statistics may be generated about app usage within a specified time period (e.g., hourly, daily, weekly, monthly), such as the percentage of total client using a particular app within the specified time period. For example, daily usage patterns may be generated for a plurality of apps based on the one or more apps having been identified as contributing to the additional network traffic.

Combined statistics may be generated reflecting frequency of app usage. Once an app-specific traffic pattern is determined, the client application map 340 may be updated, or other record of app installs generated, based on the identification of app network activity indicating which client devices known to the proxy server 110 have a particular app installed. The network traffic from these client devices with the known installation of the particular app may be considered on a regular basis (e.g., hourly, daily, weekly, monthly) to determine how often that particular app is used within a particular period of time. This may generate statistics indicating how often a particular app is used by owners of a client device in each hour, day, week, and month.

Related statistics may be generated, such as patterns reflecting how app usage changes at different time periods: whether an app is typically used more or less at a particular time of day, whether an app is typically used more or less at a particular day of the week, etc. These statistics may be generated on a general basis across all users of the app. These statistics may also be generated as specific to particular client devices. For instance, one user may be identified as using a particular app primarily during mid-afternoon with another user identified as using that particular app in the evening. In addition, any known type of pattern may be extracted from the logged data. These patterns may be applied in various ways, such as for match-making multiplayer games based the time of day in which a user is most active in a game app, targeting ads based on similarities in app usage patterns, and according to any other known technique for targeting users based on identified patterns.

Figure 4:
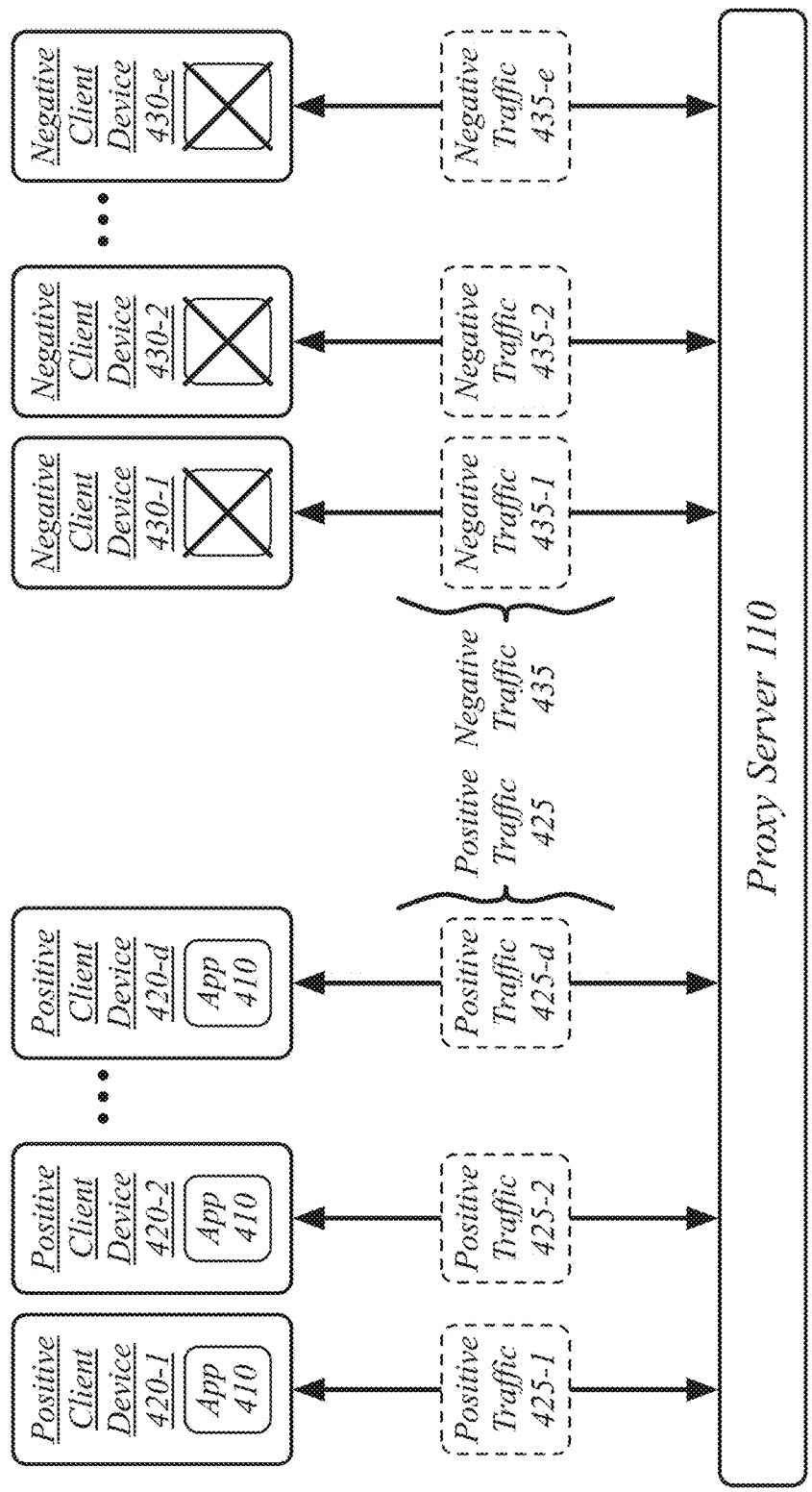
FIG. 4 illustrates the division between client traffic into a positive training set and negative training set.

FIG. 4 illustrates the division between client traffic into a positive training set and negative training set. As shown in FIG. 4, positive traffic 425 from positive client devices 420 with an app 410 installed is distinguished from negative traffic 435 from negative client devices 430 without the app 410 installed.

Positive client devices 420 may correspond to those client devices for which it has been determined that a particular app 410 has been installed at some point in the past. In some cases, the positive client devices 420 may correspond to those for which it has been specifically determined that the app 410 is still installed (e.g., has not been uninstalled or otherwise removed). For instance, the proxy server 110 may be operative to query client devices to confirm the presence of the app 410, such as by querying the operating systems of the client devices or a local app on the client devices. While client devices may not expose an interface—either externally over the network or internally to a local app—for retrieving a list of installed apps, client devices may support querying as to whether a particular app is installed. As such, the proxy server 110 may determine a list of client devices on which the app 410 is suspected to reside—for instance, because a download of the app 410 by the client devices was detected—and confirm its continued presence prior to assigning the client devices to the set of positive client devices 420 and monitoring the positive traffic 425 from the positive client devices 420 for analysis.

Negative client devices 430 may correspond to those client devices for which it has not been determined that a particular app 410 has been installed. The proxy server 110 may have determined that none of the indications it uses to detect the presence or installation of an app are present in the activities it has monitored. In some cases, the negative client devices 430 may correspond to those for which it has been specifically determined that the app 410 is not currently installed. For instance, the proxy server 110 may be operative to query client devices to confirm the absence of the app 410, such as by querying the operating systems of the client devices or a local app on the client devices. The proxy server 110 may determine a list of client devices on which the app 410 is suspected to not reside—for instance, because a download of the app 410 by the client devices was not detected—and confirm its absence prior to assigning the client devices to the set of negative client devices 430 and monitoring the positive traffic 435 from the negative client devices 430 for analysis.

A lack of the positive indications used to detect the presence or installation of the app 410 may not identically correspond to the app 410 not being present on a client device or having not been installed on a client device. For example, the app 410 may have been installed prior to the period during which the proxy server 110 is monitoring a client device for app downloads. The app 410 may have been downloaded during a period of monitoring but downloaded using a channel (e.g., Wi-Fi) that the proxy server 110 doesn't monitor, such as where the proxy server 110 primarily or only assists with cellular traffic. Similarly, the detection of positive indications of the presence or installation of the app 410 may not identically correspond to the presence of the app 410 on a client device, particularly during the period in which the network traffic for a client device is monitored. As such, the set of positive client devices 420 and the set of negative client devices 430—and therefore the positive traffic 425 and negative traffic 435—may not perfectly correspond to devices and traffic comprising the sort of data desired for analysis. Further, an app 410 may be installed on a client device but not be active, and as such not contribute to the network traffic for the client device.

Therefore, the machine learning applied to the logged elements of the positive traffic 425 and the logged elements of the negative traffic 435 may be configured to accommodate inexactness in the sorting of the traffic into positive and negative examples. The machine learning techniques may look for traffic patterns that are more prominent in the positive traffic 425 than they are in the negative traffic 435 rather than those that are present in the positive traffic 425 and absent in the negative traffic 435 as the presence of a specific traffic pattern in the negative traffic 435 may not determinatively correspond to the traffic pattern not being associated with the app 410 being considered. Similarly, the traffic pattern not being present in the network traffic for a particular client device in the set of positive client devices 420 does not necessarily indicate that the traffic pattern is not associated with the app 410 but may merely indicate that the app 410 was not performing network activity—or even not performing the particular sort of network activity responsible for the traffic pattern from among a plurality of network activities performed by the app 410—during the period in which monitoring occurred. A variety of machine learning techniques may be used in various embodiments: decision tree learning, linear classification, Bayesian analysis, or any other known technique. In some embodiments a single technique may be selected and in others a plurality of techniques may be used with the most reliable classification scheme produced by any of the plurality of techniques being used for the identification of network traffic for the app 410.

The profiling component 370 may divide the received training network traffic, such as may be represented by the training network traffic logs 325, into a positive training set and a negative training set based on the client application map 340, with the positive training set corresponding to the positive traffic 425 exchanged with the positive client devices 420 and the negative training set corresponding to the negative traffic 435 exchanged with the negative client devices 430. The profiling component 370 assigns network traffic of the training network traffic assigned to the positive training set when it is received from client devices that the client application map 340 indicates have a particular app installed. The profiling component 370 assigns network traffic of the training network traffic to the negative training set when it is received from client devices that the client application map 340 indicates do not have the particular app installed. The profiling component 370 may determine an app-specific traffic pattern for the particular app by detecting consistent differences between the positive training set and the negative training set and add the app-specific traffic pattern to the network profile map 360 as being associated with the particular app.

Figure 5:
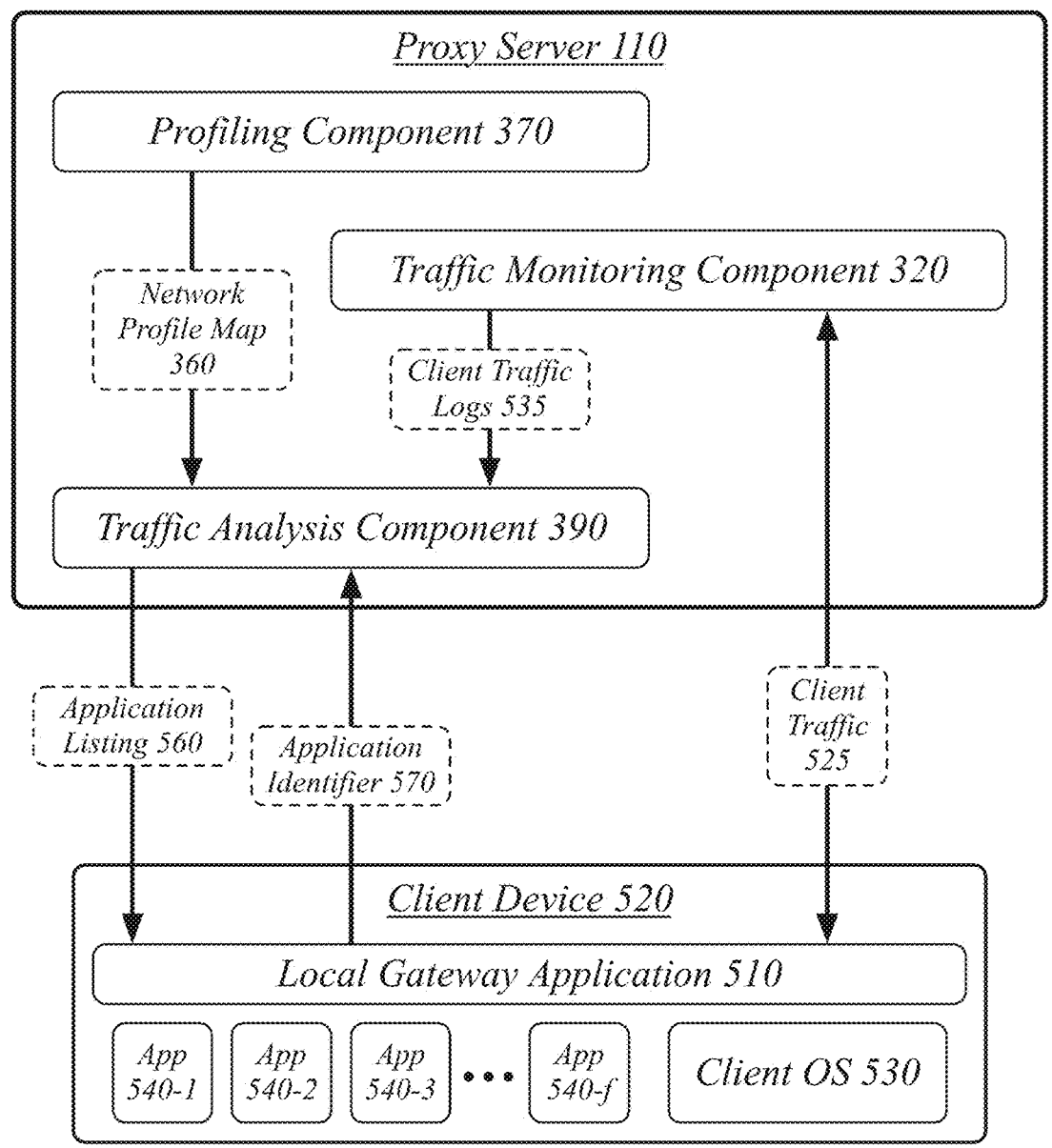
FIG. 5 illustrates a request-and-response between a proxy server and a local gateway application on a client device to clarify which app is installed on the client device.

FIG. 5 illustrates a request-and-response between a proxy server 110 and a local gateway application 510 on a client device 520 to clarify which app is installed on the client device 520. As shown in FIG. 5, the network traffic for the client device 520 is performed via the local gateway application 510.

A local gateway application 510 may be present on a client device 520 to empower the client device 520 to make use of the proxy server 110 and manage the operation of the client device 520 and its apps 540 with the proxy server 110. Network traffic of the client device 520 that is exchanged via the proxy server 110 may be transmitted through the local gateway application 510. Exchanging network traffic via the local gateway application 510 may comprise using a network interface application programming interface (API) generally providing access to networks accessible to the client device 520. For instance, the client operating system (OS) 530 of the client device 520 may automatically select a network interface from a plurality of network interfaces according to a priority of the network interfaces. The local gateway application 510 may be the highest-priority network interface of the plurality of network interfaces. The local gateway application 510 may be of a higher priority than a cellular network interface, but be of lower priority other network interfaces (e.g., a Wi-Fi network interface) access to which is not managed by the local gateway application 510. As such, in some cases, the local gateway application 510 and the proxy server 110 may only be privy to network traffic when a Wi-Fi network and other networks of higher priority than the cellular network (and therefore the local gateway application 510) are not available to the client device 520. In some embodiments, apps 540 using local gateway application 510 may first be registered with the client OS 530 or local gateway application 510 before the local gateway application 510 is a prioritized network interface for the apps 540. A user of client device 520 may have to opt-in to a privacy policy associated with local gateway application 510 prior to local gateway application 510 being used as a network interface for apps 540.

The local gateway application 510 may further operate as a local app on the client device 520 to assist the proxy server 110 in the identification of traffic patterns, such as by assisting in the identification of the currents apps 540 installed on the client device 520. In some cases, some client devices or client operating systems may support retrieving a list of current apps installed on the devices while others do not. The former devices may be used to generate training data to learn traffic patterns used to identify the apps installed on the latter. Alternatively or additionally, the local gateway application 510 may confirm the presence or absence of specific apps after app-specific traffic patterns were or were not detected in network traffic associated with the client device 520, such as where the client device 520 or client OS 530 supports queries as to the presence of absence of specific apps.

The client device 520 may exchange client traffic 525 with the proxy server 110, with the proxy server 110 forwarding the traffic—with or without modification—to a destination client device or server device. The traffic monitoring component 320 may receive the client traffic 525 and generate client traffic logs 535 that are forwarded to the traffic analysis component 390 for analysis. The traffic analysis component 390 may also receive the network profile map 360 from the profiling component 370, either directly or indirectly via a data store 310.

In some cases, it may be difficult to distinguish between multiple apps based on their network traffic while still being possible to determine a limited list that produce similar traffic patterns. The profiling component 370 may determine an app-group traffic pattern based on the training network traffic and the client application map 340, wherein the training network traffic is represented by the training network traffic logs 325. The app-group traffic pattern defines a relationship between a group of apps and network traffic indicative of the group of apps, such that the profiling component 370 has determined that the existing of the network traffic implies activity by one or more of the group of apps without having found sufficient distinctions in the data gathered so far as to determine which of the group of apps is active based on their network activity. The profiling component 370 may include the app-group traffic pattern in the network profile map 360 passed to the traffic analysis component 390.

The traffic analysis component 390 may detect the app-group traffic pattern stored in the network profile map 360 in the additional network traffic collected from client devices 120 as represented by the additional network traffic logs 380. The traffic analysis component 390 may specifically determine based on client traffic logs 535 that represent client traffic 525 from a client device 520 contains the app-group traffic pattern. The traffic analysis component 390 may transmit an application listing 560 to the client device 520, the application listing 560 a listing of the group of apps identified based on the app-group traffic pattern.

In some cases, the application listing 560 may be specifically transmitted to the local gateway application 510 on the client device 520. The local gateway application 510 may query the client OS 530, examine the storage of the client device 520, or by any other technique determine whether each app of the group of apps is installed on the client device 520 and transmit whether each app of the groups of apps is installed to the proxy server 110. The proxy server 110 may therefore receive an indication from the client device 520 indicating that a particular app of a the group of apps is confirmed as being installed on the client device 520. In some cases, the indication may indicate that more than one of the group of apps is installed on the client device 520.

The application listing 560 may associate each app of the groups of app with an application identifier. The application identifiers may comprise identifiers assigned by the application identification system 100. The application identifiers may comprise standardized names or identifiers used by an app repository in the storage, distribution, and identification of apps. The local gateway application 510 may transmit the application identifier 570 for the app it confirms as being installed on the client device 520 to the traffic analysis component 390. Where multiple apps of the group of apps are confirmed as being installed on the device the local gateway application 510 may transmit a plurality of application identifiers to the traffic analysis component 390 corresponding to the group of apps.

Figure 6:
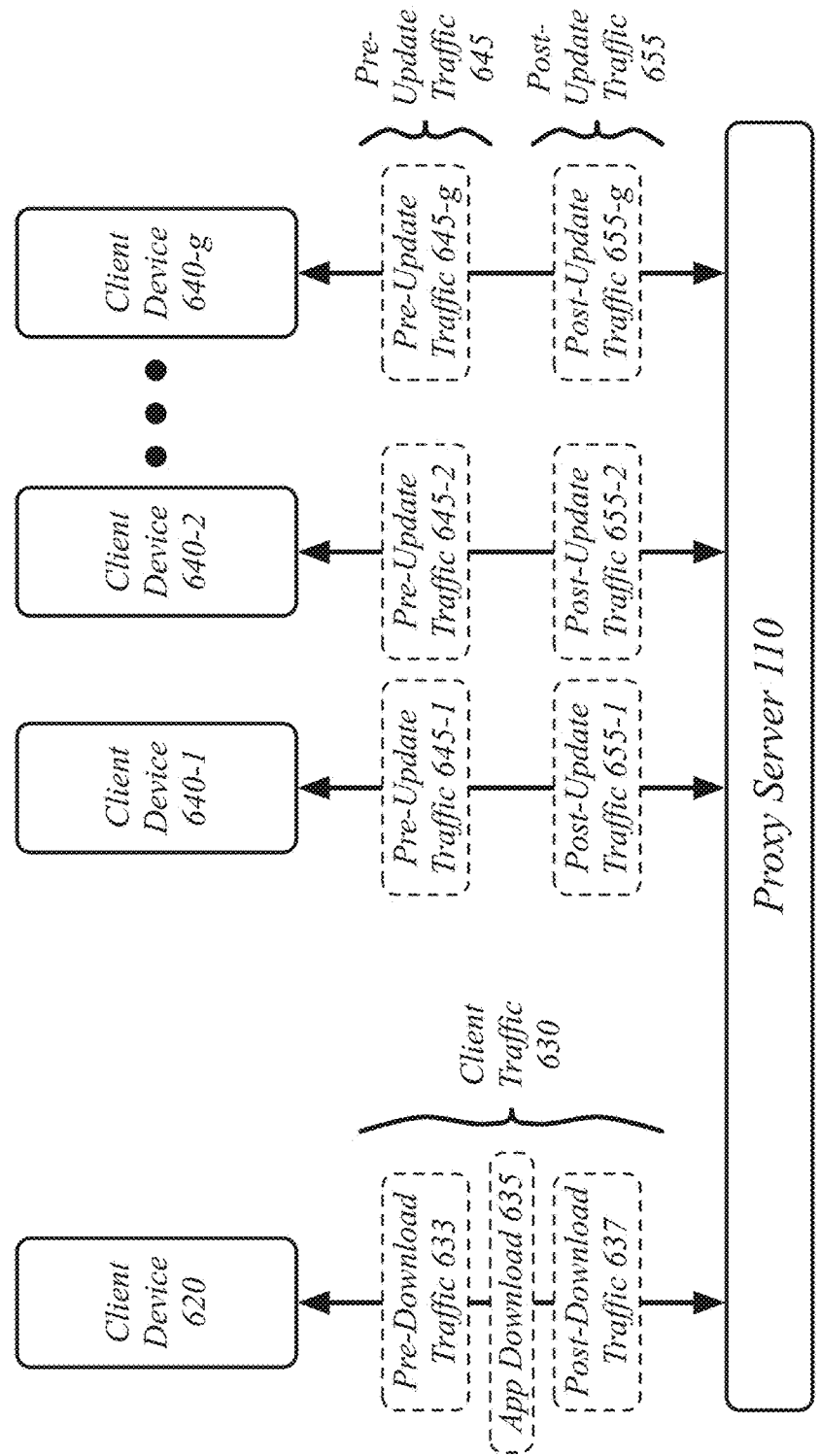
FIG. 6 illustrates the application identification system dividing client traffic based on the timing of particular events.

FIG. 6 illustrates the application identification system 100 dividing client traffic based on the timing of particular events. As shown in FIG. 6, network traffic from the client device 620 is divided into traffic that occurs prior to an app being downloaded and after being downloaded and network traffic from client devices 640 is divided into traffic that occurs before an app update is released and after the app update is released.

The proxy server 110 may detect an app download 635 by a client device 620 in client traffic 630 exchanged between the client device 620 and the proxy server 110. This may result in the client device 620 being included in the set of positive client devices 420 such that traffic from it is included in the positive traffic 425 used as a positive example set during analysis. Similarly, the client application map 340 may be modified by the client record component 330 to indicate that the client device 620 has installed an instance of the app contained in the app download 635.

Further, if the proxy server 110 has been monitoring the client traffic 630 of the client device 620 prior to the app download 635 then a change in the characteristics of the post-download traffic 637 as compared to the pre-download traffic 633 may provide particularly strong evidence of an app-specific traffic pattern for the app contained in the app download 635. Users may be particularly likely to use apps shortly after they have been downloaded due to the novelty of a recently-acquired app. User may be particularly likely to download an app when they have an imminent need to use the app. For both these reasons, apps may be particularly likely to be used in the period following their download.

As such, the pre-download traffic 633 and the post-download traffic 637 may be appropriate for respective inclusion in the negative training set and positive training set. The negative training set for an app may therefore be comprised, partially or entirely, of logged elements of pre-download traffic from client devices prior to the detection of that app being downloaded by the client devices, with the time periods represented in the negative training set varying for each of client devices according to the time that the download of the app is detected for each client device. Correspondingly, the positive training set set for the app may be comprised, partially or entirely, of logged elements of post-download traffic from client devices subsequent to the detection of that being downloaded by the client devices, with the time periods represented in the positive training set similarly varying for each of client devices according to the time that the download of the app is detected for each client device.

In some cases, the network traffic exchanged by an app may change after an update to the app. A new protocol may be used, a modified user agent field may represent the new version, a resource at a new URL may be requested, or some other change may be introduced. When the network traffic for a client device changes after an app has been updated, indicators in the traffic that disappear after an update may therefore be associated with the previous version of the app and indicators in the traffic that appear after an update may be associated with the updated version of the app.

Each of the client devices 640 may have been inferred to have a particular app installed. Network traffic exchange by the client devices 640 may be divided into pre-update traffic 645 and post-update traffic 655. In some embodiments, the division may be individual to each app based on a specific detection of an update to the app being downloaded. In other embodiments, the division may be global based on a release of an updated version of an app, such as where the updated version becomes available on a repository. The profiling component 370 may detect or otherwise receive notification that a particular app has had a release of an updated version. The profiling component 370 may detect a change in the training network after the release of the updated version due to the client devices 640 updating to the new version, even if that updating occurs via a network interfaces, such as Wi-Fi, not channeled through the proxy server 110.

The profiling component 370 may use the pre-update traffic 645 as the negative training set and the post-update traffic 655 as the positive training set for determining an app-specific traffic pattern, or a version-specific app traffic pattern, for the updated version of an app. Additionally, the profiling component 370 may use the pre-update traffic 645 as the positive training set and the post-update traffic 655 as the negative training set for determining an app-specific traffic pattern, or a version-specific app traffic pattern, for the previous version of the app. The profiling component 370 may detect a change in training network traffic after the release of the updated version of the app. The traffic analysis component 390 may indicate that one or more client devices of the plurality of client devices 640 have the app installed based on the change in the received network traffic being associated with the one or more client devices.

A version-specific app traffic pattern may be used for identifying what apps are installed on client devices. Detecting a version-specific app traffic pattern for either the updated version or the previous version may indicate the app is installed on the client devices. A version-specific app traffic pattern may be particularly valuable for identifying how many or what percentage of users have updated an app. The detection of a version-specific app traffic pattern may be logged for both the previous version and updated version of the app. By comparing the number of clients producing traffic with the previous version and updated version it may be determined, over time, what percentage of clients have been updated to the new version.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a client application map 340, the client application map 340 to represent installations of a plurality of apps on a plurality of client devices at block 702. Previous network traffic of the plurality of client may have been monitored, with app downloads detected in the monitor previous traffic. At least a portion of the client application map 340 may have been determined based on the detected app downloads.

The logic flow 700 may receive training network traffic from one or more network interface controllers, the training network traffic exchanged with at least some of the plurality of client devices at block 704. The training network traffic may be received as part of the operation of a proxy server 110, with the training network traffic transmitted to the proxy server 110 as part of the network operations of the plurality of client devices.

The logic flow 700 may generate a network profile map 360 using machine learning based on the training network traffic and the client application map 340, the network profile map 360 comprising app-specific traffic patterns defining relationships between the plurality of apps and network traffic produced by the plurality of apps at block 706. The app-specific traffic patterns may be based on at least one of uniform resource locators, hypertext transport protocol parameters, and user-agents associated with specific apps.

The received training network traffic may be divided into a positive training set and a negative training set based on the client application map 340, wherein network traffic of the training network traffic is assigned to the positive training set when it is received from client devices that the client application map 340 indicates have a particular app installed, and wherein network traffic of the training network traffic is assigned to the negative training set when it is received from client devices that the client application map 340 indicates do not have the particular app installed. An app-specific traffic pattern may be determined for the particular app by detecting consistent differences between the positive training set and the negative training set. The app-specific traffic pattern may be added to the network profile map 360.

A change may be detected in the training network traffic after the release of an updated version of a particular app. The release of the updated version of the particular app may have been detected, resulting in initiation of monitoring for this sort of change in the training network traffic. Detecting this change in the training network traffic for one or more client devices of the plurality of client devices may result in it being indicated that the one or more client devices have the particular app installed. In some cases this may be based on the association of the change in the received network traffic with the one or more client devices independent of the detection of any specific patterns.

The logic flow 700 may receive additional network traffic at block 708. The additional network traffic may be received as part of the operation of a proxy server 110, with the additional network traffic transmitted to the proxy server 110 as part of the network operations of the plurality of client devices. The additional network traffic may be received from the same one or more NICs as the training network traffic or may be received using a different one or more NICs, such as where different servers or other devices are used or are included within app recognition as were used for gathering training data for machine learning.

The logic flow 700 may identify one or more apps of the plurality of apps as having contributed to the additional network traffic based on the network profile map 360 at block 710. One or more apps of the plurality of apps may identified as being installed on a particular client device, the additional network traffic associated with the particular client device, based on the one or more apps having been identified as contributing to the additional network traffic.

Usage patterns may be generated for a plurality of apps, the additional network traffic associated with the second plurality of client devices, based on the one or more apps having been identified as contributing to the additional network traffic. The usage patterns may be generated for a day, week, month, or other period of time. The usage patterns may be generated daily, weekly, monthly, or on another schedule corresponding to the period covered by the usage pattern.

An app-group traffic pattern may have been determined based on the training network traffic and the client application map 340, the app-group traffic pattern defining a relationship between a group of apps and network traffic indicative of the group of apps. The app-group traffic pattern may be detected in the additional network traffic, the additional network traffic associated with a particular client device. A listing of the group of apps may be transmitted to the particular client device. An indication may be received from the particular client device indicating that a particular app of the group of apps is confirmed as being installed on the particular client device. The embodiments are not limited to this example.

Figure 8:
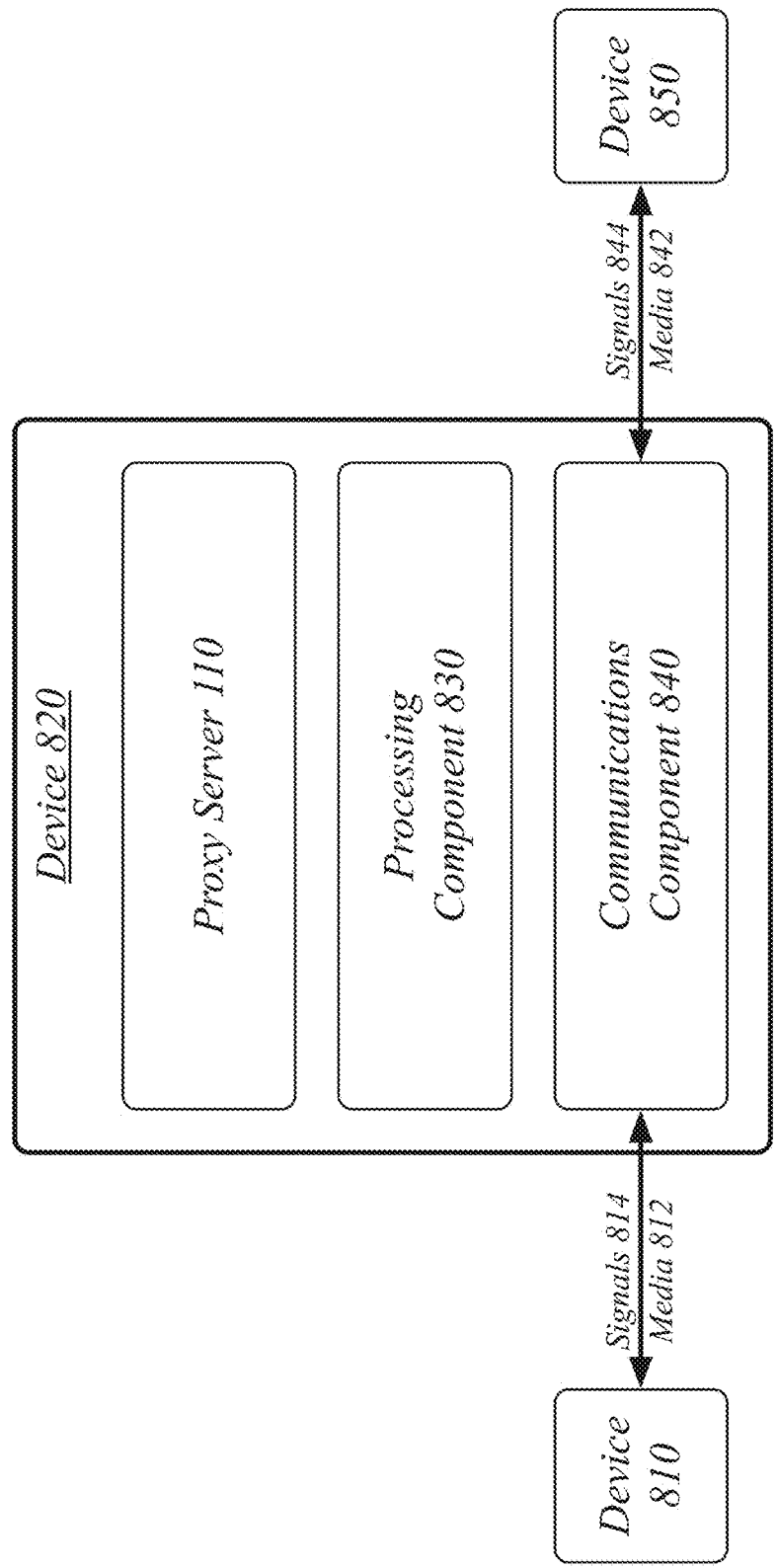
FIG. 8 illustrates an embodiment of a centralized system for the system of FIG. 1.

FIG. 8 illustrates a block diagram of a centralized system 800. The centralized system 800 may implement some or all of the structure and/or operations for the application identification system 100 in a single computing entity, such as entirely within a single device 820.

The device 820 may comprise any electronic device capable of receiving, processing, and sending information for the application identification system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the application identification system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the application identification system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation. Devices 810 and 850 may comprise devices in communication with each other via the proxy server 110 executing on the device 820. The signals 814 may comprise network traffic exchanged with the proxy server 110 that is forwarded to, or is the forwarding of, signals 844. In various embodiments, devices 810, 850 may comprise client devices, may comprise server devices, or may comprise some combination thereof.

Figure 9:
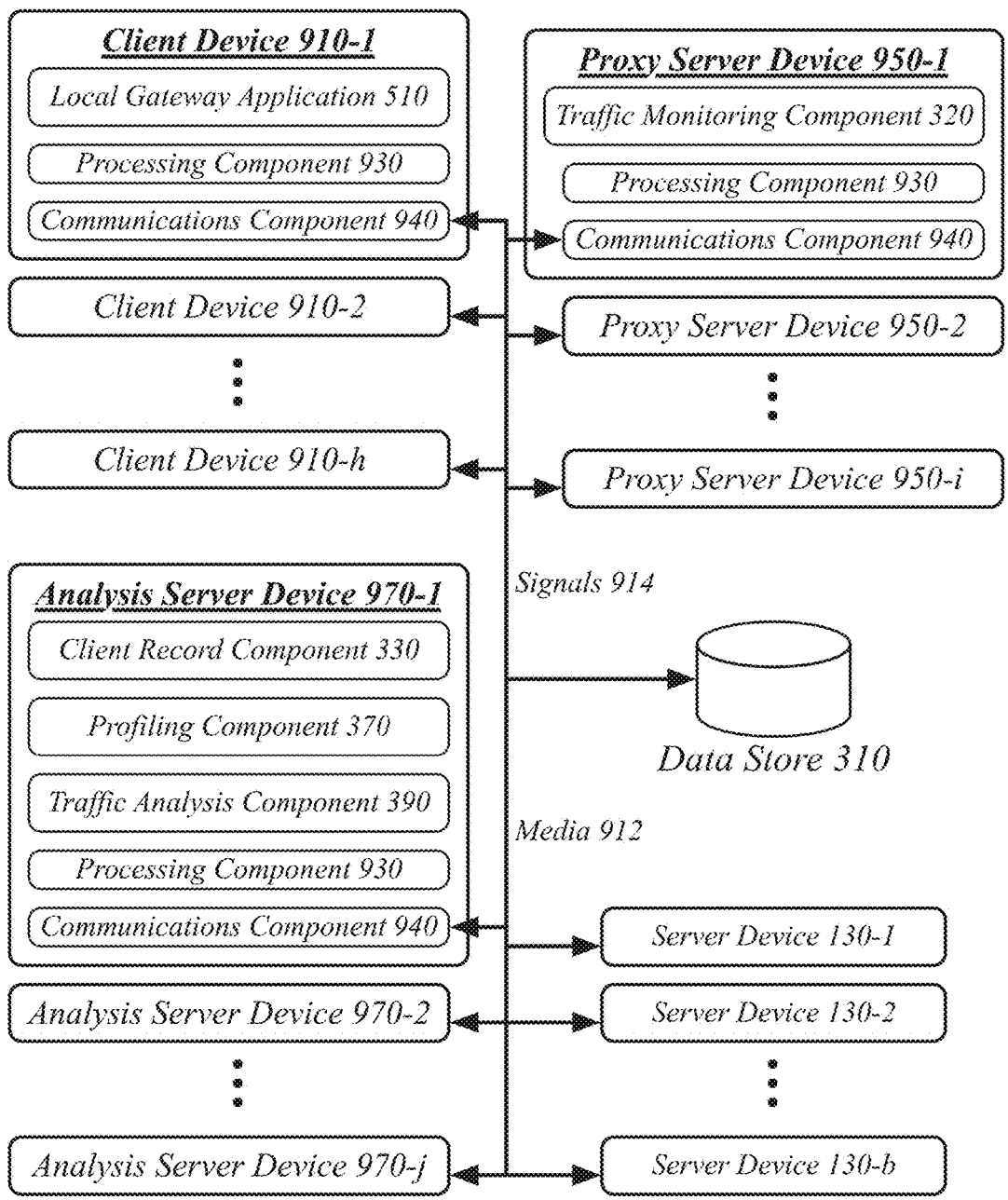
FIG. 9 illustrates an embodiment of a distributed system for the system of FIG. 1.

FIG. 9 illustrates a block diagram of a distributed system 900. The distributed system 900 may distribute portions of the structure and/or operations for the application identification system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise client devices 910, proxy server devices 950, and analysis server devices 970. In general, the client devices 910, proxy server devices 950, and analysis server devices 970 may be the same or similar to the device 820 as described with reference to FIG. 8. For instance, the client devices 910, proxy server devices 950, and analysis server devices 970 may each comprise a processing component 930 and a communications component 940 which are the same or similar to the processing component 830 and the communications component 840, respectively, as described with reference to FIG. 8. In another example, the devices 910, 950, and 970 may communicate over a communications media 912 using communications signals 914 via the communications components 940.

The client device 910 may comprise or employ one or more client programs that operate to perform various methodologies in accordance with the described embodiments. In one embodiment, for example, the client devices 910 may execute instances of the local gateway application 510 for use in communicating with the proxy server devices 950. The signals 914 sent from the client devices 910 may comprise network traffic transmitted to the proxy server devices 950 for forwarding to other client devices of the client devices 910 or any of the server devices 130 accessible via the media 912. In some embodiments, each of the client devices 910 may be assigned to a particular proxy server device and to a particular port on their assigned proxy server device.

The proxy server devices 950 may comprise or employ one or more server programs that operate to perform various methodologies in accordance with the described embodiments. In one embodiment, for example, the proxy server devices 950 may implement the traffic monitoring component 920, producing network traffic logs such as the training network traffic logs 325, the additional network traffic logs 380, and the client traffic logs 535. The signals 914 sent from the proxy server devices 950 may comprise network traffic forwarded on behalf of client devices 910 to other client devices of the client devices 910 or any of the server devices 130. The signals 914 sent from the proxy server devices 950 may comprise the transmission of network traffic logs to the analysis server devices 970 or to the data store 310 for eventual retrieval by the analysis server devices 970.

The analysis server devices 970 may comprise or employ one or more server programs that operate to perform various methodologies in accordance with the described embodiments. In one embodiments, for example, the analysis server devices 970 may implement the client record component 330, profiling component 370, and traffic analysis component 390. The signals 914 exchanged by the analysis server devices 970 may comprise the reception of network traffic logs from the proxy server devices 950 or the retrieval of network traffic logs from the data store 310. The signals 914 exchanged by the analysis server devices 970 may further comprise the storing and retrieving of the client application map 340 and the network profile map 360.

It will be appreciated that in various embodiments different combination of components of the application identification system 100 may be co-located on a same computing device. In various embodiments, any or all of the client record component 330, profiling component 370, and traffic analysis component 390 may be located on the proxy server devices 950 so as to avoid the transmission of network traffic or network traffic logs between server devices for analysis.

Figure 10:
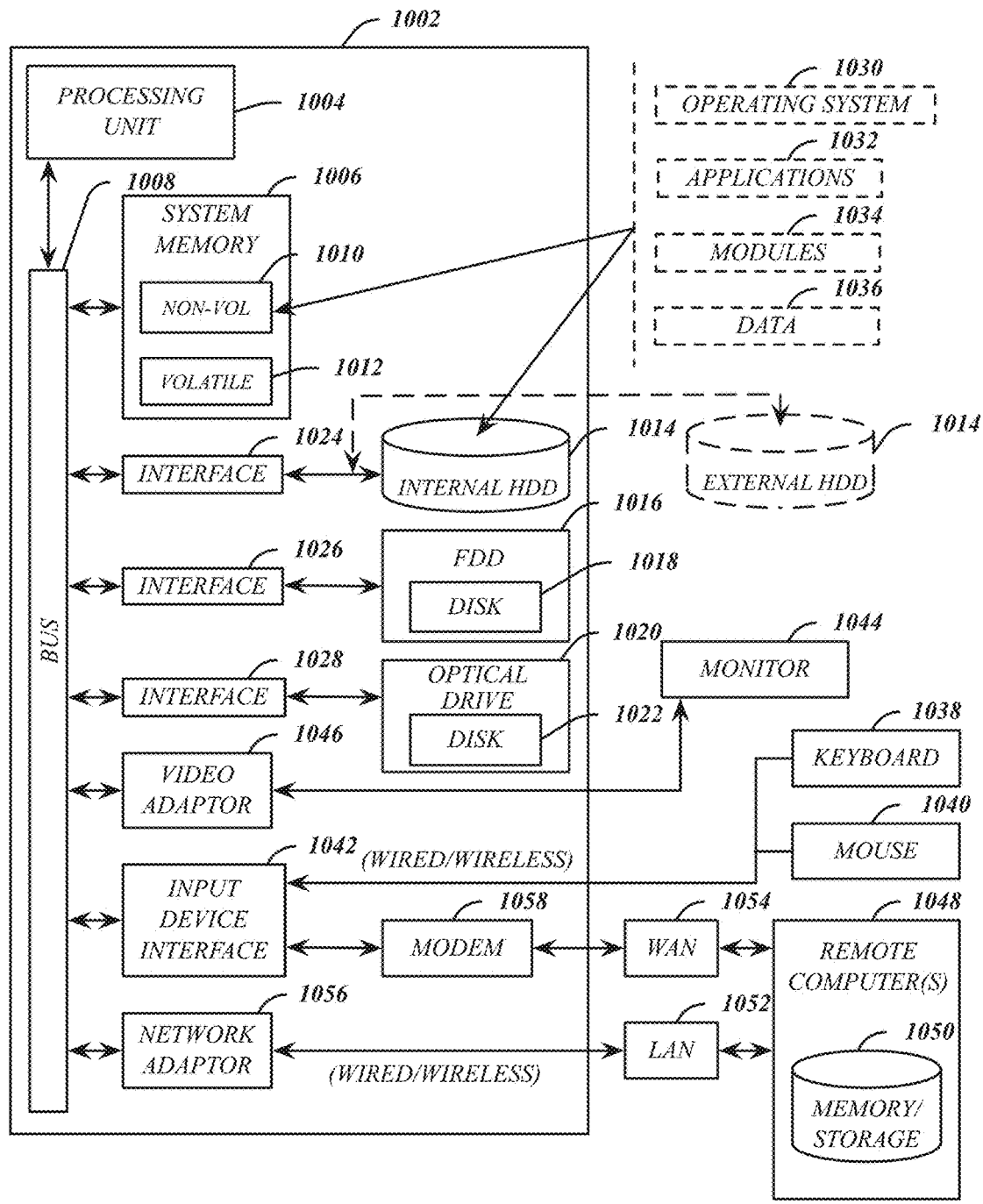
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the application identification system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
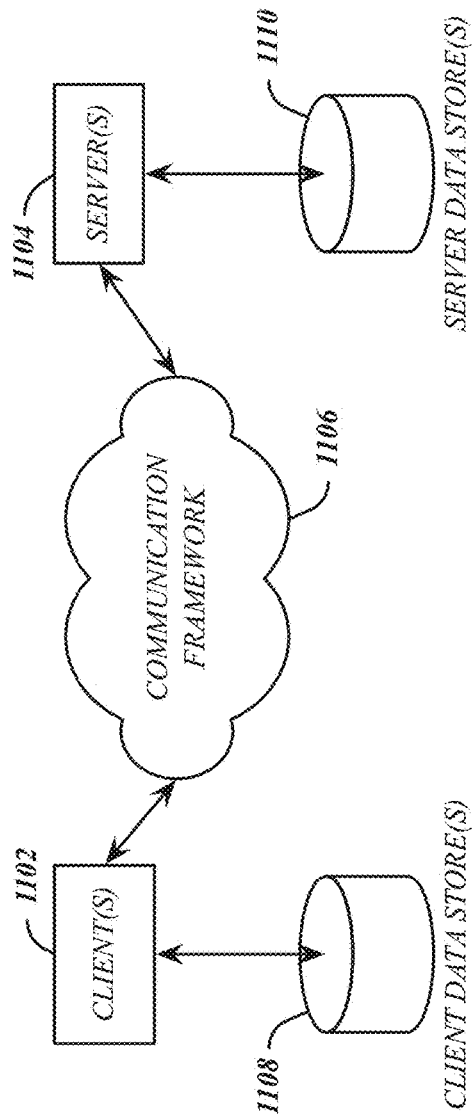
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
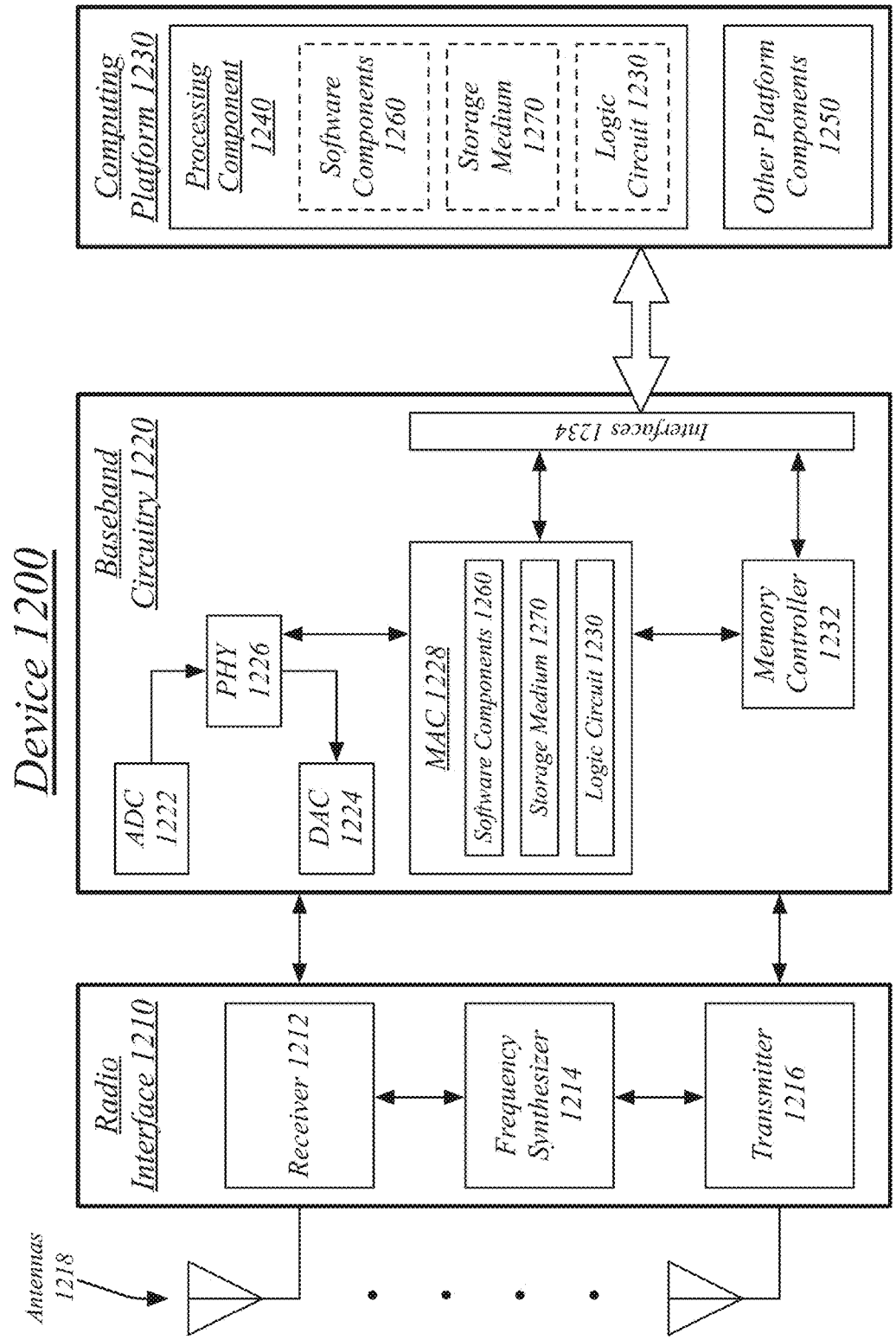
FIG. 12 illustrates an embodiment of a radio device architecture.

FIG. 12 illustrates an embodiment of a device 1200 for use in a multicarrier OFDM system, such as the system 100. Device 1200 may implement, for example, software components 1260 as described with reference to system 100 and/or a logic circuit 1230. The logic circuit 1230 may include physical circuits to perform operations described for the system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the system 100 and/or logic circuit 1230 in a single computing entity, such as entirely within a single device. Alternatively, the device 1200 may distribute portions of the structure and/or operations for the system 100 and/or logic circuit 1230 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the system 100 and logic circuit 1230 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a client application map, the client application map to represent installations of a plurality of applications on a plurality of client devices; receiving training network traffic from one or more network interface controllers, the training network traffic exchanged with at least some of the plurality of client devices; and generating a network profile map using machine learning based on the training network traffic and the client application map, the network profile map comprising application-specific traffic patterns defining relationships between the plurality of applications and network traffic produced by the plurality of applications.

A computer-implemented method may further comprise the application-specific traffic patterns based on at least one of uniform resource locators, hypertext transport protocol parameters, and user-agents associated with specific applications.

A computer-implemented method may further comprise receiving additional network traffic; and identifying one or more apps of the plurality of apps as having contributed to the additional network traffic based on the network profile map.

A computer-implemented method may further comprise the additional network traffic associated with a particular client device, further comprising: identifying one or more applications of the plurality of applications as being installed on the particular client device based on the one or more applications having been identified as contributing to the additional network traffic.

A computer-implemented method may further comprise the additional network traffic associated with a second plurality of client devices, further comprising: generating usage patterns for the second plurality of applications based on the one or more applications having been identified as contributing to the additional network traffic.

A computer-implemented method may further comprise dividing the received training network traffic into a positive training set and a negative training set based on the client application map, wherein network traffic of the training network traffic is assigned to the positive training set when it is received from client devices that the client application map indicates have a particular application installed, wherein network traffic of the training network traffic is assigned to the negative training set when it is received from client devices that the client application map indicates do not have the particular application installed; determining an application-specific traffic pattern for the particular application by detecting consistent differences between the positive training set and the negative training set; and adding the application-specific traffic pattern to the network profile map.

A computer-implemented method may further comprise receiving previous network traffic of the plurality of client devices; detecting application downloads in the receiving previous network traffic; and determining at least a portion of the client application map based on the detected application downloads.

A computer-implemented method may further comprise detecting that a particular application has had a release of an updated version; detecting a change in the training network traffic after the release of the updated version of the particular app; indicating that one or more client devices of the plurality of client devices have the particular application installed based on the change in the received network traffic being associated with the one or more client devices.

A computer-implemented method may comprise receiving a network profile map, the network profile map comprising application-specific traffic patterns defining relationships between a plurality of applications and network traffic produced by the plurality of applications; receiving additional network traffic; and identifying one or more applications of the plurality of applications as having contributed to the additional network traffic based on the network profile map.

A computer-implemented method may further comprise the additional network traffic associated with a particular client device, further comprising: identifying one or more applications of the plurality of applications as being installed on the particular client device based on the one or more applications having been identified as contributing to the additional network traffic.

A computer-implemented method may further comprise the additional network traffic associated with a second plurality of client devices, further comprising: generating usage patterns for the second plurality of applications based on the one or more applications having been identified as contributing to the additional network traffic.

A computer-implemented method may further comprise the additional network traffic associated with a particular client device, the network profile map comprising an application-group traffic pattern, the application-group traffic pattern defining a relationship between a group of applications and network traffic indicative of the group of applications, further comprising: detecting the application-group traffic pattern in the additional network traffic; transmitting a listing of the group of applications to the particular client device; and receiving an indication from the particular client device indicating that a particular application of the group of applications is confirmed as being installed on the particular client device.

An apparatus may comprise a processor circuit on a device; a client record component operative on the processor circuit to store a client application map, the client application map to represent installations of a plurality of applications on a plurality of client devices; a traffic monitoring component operative on the processor circuit to monitor training network traffic on one or more network interface controllers, the training network traffic generated by at least some of the plurality of client devices; and a profiling component operative on the processor circuit to generate a network profile map using machine learning based on the training network traffic and the client application map, the network profile map comprising application-specific traffic patterns defining relationships between the plurality of applications and network traffic produced by the plurality of applications. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a client application map, the client application map to represent installations of a plurality of different applications on a plurality of client devices;
receiving training network traffic from one or more network interface controllers, the training network traffic exchanged with at least some of the plurality of client devices;
generating a network profile map using machine learning based on the training network traffic and the client application map, the network profile map comprising a first association between a first application of the different applications to a first application-specific traffic pattern of network traffic produced by the first application and a second association between a second application of the different applications to a second application-specific traffic pattern of network traffic produced by the second application; and
using the network profile map to identify one or more of an installation prevalence, market penetration, time-period based usage, or frequency of use of the plurality of different applications in non-training network traffic.

2. The method of claim 1, the application-specific traffic patterns based on at least one of uniform resource locators, hypertext transport protocol parameters, and user-agents associated with specific applications.

3. The method of claim 1, further comprising:
receiving additional network traffic; and
identifying one or more apps of the plurality of apps as having contributed to the additional network traffic based on the network profile map.

4. The method of claim 3, the additional network traffic associated with a particular client device, further comprising:
identifying one or more applications of the plurality of applications as being installed on the particular client device based on the one or more applications having been identified as contributing to the additional network traffic.

5. The method of claim 3, the additional network traffic associated with a second plurality of client devices, further comprising:

generating usage patterns for the second plurality of applications based on the one or more applications having been identified as contributing to the additional network traffic.

6. The method of claim 1, comprising:
identifying that a first set of client devices in the client application map that have a particular application installed and a second set of client devices in the client application map that do not have the particular application installed;
dividing the received training network traffic into a positive training set and a negative training set based on the client application map, wherein network traffic of the training network traffic is assigned to the positive training set when it is received from the first set of client devices, wherein network traffic of the training network traffic is assigned to the negative training set when it is received from the second set of client devices;
determining an application-specific traffic pattern for the particular application from the positive training set by detecting differences between the positive training set and the negative training set; and
adding the application-specific traffic pattern to the network profile map.

7. The method of claim 1, comprising:
receiving previous network traffic of the plurality of client devices;
detecting application downloads in the receiving previous network traffic; and
determining at least a portion of the client application map based on the detected application downloads.

8. The method of claim 1, comprising:
detecting that a particular application has had a release of an updated version;
detecting a change in the training network traffic after the release of the updated version of the particular app;
indicating that one or more client devices of the plurality of client devices have the particular application installed based on the change in the received network traffic being associated with the one or more client devices.

9. An apparatus, comprising:
a processor circuit;
a client record component operative on the processor circuit to store a client application map, the client application map to represent installations of a plurality of different applications on a plurality of client devices;
a traffic monitoring component operative on the processor circuit to monitor training network traffic on one or more network interface controllers, the training network traffic generated by at least some of the plurality of client devices; and
a profiling component operative on the processor circuit to generate a network profile map using machine learning based on the training network traffic and the client application map, the network profile map comprising a first association between a first application of the different applications to a first application-specific traffic pattern of network traffic produced by the first application and a second association between a second application of the different applications to a second application-specific traffic pattern of network traffic produced by the second application, and operative to use the network profile map to identify one or more of an installation prevalence, market penetration, time-period based usage, or frequency of use of the plurality of different applications in non-training network traffic.

10. The apparatus of claim 9, the application-specific traffic patterns based on at least one of uniform resource locators, hypertext transport protocol parameters, and user-agents associated with specific applications.

11. The apparatus of claim 9, further comprising:
a traffic analysis component operative to identify one or more applications of the plurality of applications as having contributed to additional network traffic based on the network profile map.

12. The apparatus of claim 11, the additional network traffic associated with a particular client device, the traffic analysis component operative to identify one or more applications of the plurality of applications as being installed on the particular client device based on the one or more applications having been identified as contributing to the additional network traffic.

13. The apparatus of claim 11, the additional network traffic associated with a second plurality of client devices, the traffic analysis component operative to generate usage patterns for the second plurality of applications based on the one or more applications having been identified as contributing to the additional network traffic.

14. The apparatus of claim 9, the profiling component operative to: identify that a first set of client devices in the client application map that have a particular application installed and a second set of client devices in the client application map that do not have the particular application installed; divide the received training network traffic into a positive training set and a negative training set based on the client application map, wherein network traffic of the training network traffic is assigned to the positive training set when it is received from the first set of client devices, wherein network traffic of the training network traffic is assigned to the negative training set when it is received from the second set of client devices; determine an application-specific traffic pattern for the particular application from the positive training set by detecting differences between the positive training set and the negative training set; and add the application-specific traffic pattern to the network profile map.

15. The apparatus of claim 9, the traffic monitoring component operative to monitor previous network traffic of the plurality of client devices and detect application downloads in the monitored previous network traffic, wherein at least a portion of the client application map is determined based on the detected application downloads.

16. At least one non-transitory computer-readable storage medium comprising instructions that, when executed, cause a system to:
receive a client application map, the client application map to represent installations of a plurality of different applications on a plurality of client devices;
capture training network traffic for at least some of the plurality of client devices from one or more network interface controllers;
generate a network profile map using machine learning based on the training network traffic and the client application map, the network profile map comprising a first association between a first application of the different applications to a first application-specific traffic pattern of network traffic produced by the first application and a second association between a second application of the different applications to a second application-specific traffic pattern of network traffic produced by the second application; and use the network profile map to identify one or more of an installation prevalence, market penetration, time-period based usage, or frequency of use of the plurality of different applications in non-training network traffic.

17. The computer-readable storage medium of claim 16, the application-specific traffic patterns based on at least one of uniform resource locators, hypertext transport protocol parameters, and user-agents associated with specific applications.

18. The computer-readable storage medium of claim 16, comprising further instructions that, when executed, cause a system to:
capture additional network traffic;
identify one or more applications of the plurality of applications as having contributed to the additional network traffic based on the network profile map; and
identify one or more applications of the plurality of applications as being active on one or more client devices based on the one or more applications being identified as contributing to the additional network traffic.

19. The computer-readable storage medium of claim 18, comprising further instructions that, when executed, cause a system to:
generate usage patterns for a second plurality of applications based on the one or more applications having been identified as contributing to the additional network traffic.

20. The computer-readable storage medium of claim 16, comprising further instructions that, when executed, cause a system to:
identify that a first set of client devices in the client application map that have a particular application installed and a second set of client devices in the client application map that do not have the particular application installed;
divide the received training network traffic into a positive training set and a negative training set based on the client application map, wherein network traffic of the training network traffic is assigned to the positive training set when it is received from the first set of client devices, wherein network traffic of the training network traffic is assigned to the negative training set when it is received from the second set of client devices;
determine an application-specific traffic pattern for the particular application from the positive training set by detecting differences between the positive training set and the negative training set; and
add the application-specific traffic pattern to the network profile map.

21. A computer-implemented method, comprising:
receiving a network profile map, the network profile map comprising a first association between a first application of a plurality of different applications to a first application-specific traffic pattern of network traffic produced by the first application and a second association between a second application of the different applications to a second application-specific traffic pattern of network traffic produced by the second application;
receiving additional network traffic;
identifying one or more applications of the plurality of different applications as having contributed to the additional network traffic based on the network profile map; and
using the network profile map to identify one or more of an installation prevalence, market penetration, time-period based usage, or frequency of use of the plurality of different applications in the additional network traffic.

22. The method of claim 21, the additional network traffic associated with a particular client device, further comprising:
identifying one or more applications of the plurality of applications as being installed on the particular client device based on the one or more applications having been identified as contributing to the additional network traffic.

23. The method of claim 21, the additional network traffic associated with a second plurality of client devices, further comprising:
generating usage patterns for the second plurality of applications based on the one or more applications having been identified as contributing to the additional network traffic.

24. The method of claim 21, the additional network traffic associated with a particular client device, the network profile map comprising an application-group traffic pattern, the application-group traffic pattern defining a relationship between a group of applications and network traffic indicative of the group of applications, further comprising:
detecting the application-group traffic pattern in the additional network traffic;
transmitting a listing of the group of applications to the particular client device; and
receiving an indication from the particular client device indicating that a particular application of the group of applications is confirmed as being installed on the particular client device.

25. The method of claim 1, wherein the machine learning is configured to accommodate inexactness in sorting the training network traffic into positive and negative examples by identifying traffic patterns that are more prominent in the positive examples than in the negative examples.

* * * * *